(12) United States Patent
Aso

(10) Patent No.: US 11,407,044 B2
(45) Date of Patent: Aug. 9, 2022

(54) CUTTING TOOL

(71) Applicant: TUNGALOY CORPORATION, Fukushima (JP)

(72) Inventor: Takahiro Aso, Iwaki (JP)

(73) Assignee: TUNGALOY CORPORATION, Iwaki (JP)

( * ) Notice: Subject to any disclaimer, the term of this patent is extended or adjusted under 35 U.S.C. 154(b) by 160 days.

(21) Appl. No.: 16/839,026

(22) Filed: Apr. 2, 2020

(65) Prior Publication Data
US 2020/0406379 A1 Dec. 31, 2020

(30) Foreign Application Priority Data
Jun. 28, 2019 (JP) .............................. JP2019-121372

(51) Int. Cl.
*B23C 5/28* (2006.01)
*B23B 51/06* (2006.01)
*B23Q 11/10* (2006.01)
*B23C 5/10* (2006.01)
*B23B 27/10* (2006.01)

(52) U.S. Cl.
CPC ................ *B23C 5/28* (2013.01); *B23B 27/10* (2013.01); *B23B 51/06* (2013.01); *B23C 5/109* (2013.01); *B23Q 11/1015* (2013.01); *B23C 2210/50* (2013.01); *B23C 2250/12* (2013.01)

(58) Field of Classification Search
CPC ........... B23C 5/28; B23B 27/10; B23B 51/06; B23Q 11/1023
See application file for complete search history.

(56) References Cited

U.S. PATENT DOCUMENTS

| 2012/0230781 | A1* | 9/2012 | Hoffer | B23Q 11/1023 |
| | | | | 407/11 |
| 2013/0034399 | A1 | 2/2013 | Omagari | |
| 2014/0255115 | A1 | 9/2014 | Zabrosky | |
| 2018/0290218 | A1* | 10/2018 | Ericson | B23C 5/28 |

FOREIGN PATENT DOCUMENTS

| CH | 708238 A2 | 12/2014 | |
| CN | 109352056 A | 2/2019 | |
| DE | 3814565 A * | 7/1989 | ........... B23B 31/201 |

(Continued)

OTHER PUBLICATIONS

English machine translation of JP 2004042209A (Year: 2004).*
English machine translation of DE 4416380 (Year: 1995).*

*Primary Examiner* — Alan Snyder
(74) *Attorney, Agent, or Firm* — Studebaker & Brackett PC

(57) ABSTRACT

An object of the present invention is to provide a cutting tool that requires the smaller number of parts and can be manufactured at a lower cost. A cutting tool includes: a tool body extending along a central axis and rotatable around the central axis; a cutting insert to be mounted on an insert mounting seat of the tool body; and at least one flow passage provided inside the tool body, the at least one flow passage extending from a back end side toward a front end side of the tool body so as to supply a coolant toward at least a part of the inside of the tool body, a back end side of the at least one flow passage being open at a portion sealed by the tool body and the holding member when the holding member is coupled.

6 Claims, 12 Drawing Sheets

(56) References Cited

FOREIGN PATENT DOCUMENTS

| | | | |
|---|---|---|---|
| DE | 4416380 A1 * | 11/1995 | ............ B23C 5/006 |
| GB | 2501511 A | 10/2013 | |
| JP | 3026256 U | 7/1996 | |
| JP | 2002-321111 A | 11/2002 | |
| JP | 2004042209 A * | 2/2004 | |
| JP | 2005-007513 A | 1/2005 | |
| JP | 2011-056604 A | 3/2011 | |
| JP | 2013-035070 A | 2/2013 | |
| JP | 2013-082024 A | 5/2013 | |
| JP | 2016-508889 A | 3/2016 | |
| JP | 6352752 B2 | 7/2018 | |
| WO | WO-2010102793 A1 * | 9/2010 | ......... B23B 31/1107 |

* cited by examiner

CUTTING TOOL

CROSS-REFERENCES TO RELATED APPLICATIONS

This application relates to and claims priority from Japanese Patent Application No. 2019-121372, filed on Jun. 28, 2019, the entire disclosure of which are incorporated herein by reference.

BACKGROUND

Field

The present invention relates to a cutting tool.

Description of Related Art

A cutting tool disclosed in Japanese Patent No. 6352752 is known as a cutting tool used in a cutting process of a work material such as metal.

The cutting tool described in Japanese Patent No. 6352752 includes a tool body (holder) and a plurality of inserts. The tool body has an insert pocket to which the inserts are attached. The tool body has a flow passage formed therein for supplying a coolant to cutting edges of the inserts.

The flow passage 11 in Japanese Patent No. 6352752 functions as a portion in which the coolant flows during use of the cutting tool and has a first flow passage 15, a second flow passage 17, and a third flow passage 19 (see FIG. 7 or the like in Japanese Patent No. 6352752). The first flow passage 15 is provided along the central axis O from the back end side toward the front end side of the tool body. The second flow passage 17 is connected to the first flow passage 15 and is provided from the first flow passage 15 toward the outer circumferential surface of the tool body. The third flow passage 19 is connected to the second flow passage 17 and is provided from the second flow passage 17 to the insert pocket 9. The coolant is introduced from the back end side of the tool body into the first flow passage 15 and then passes through the third flow passage 19 and is injected from an opening open in the insert pocket 9. The injected coolant cools the cutting edges of the inserts.

SUMMARY

In the cutting tool described in Japanese Patent No. 6352752, the second flow passage 17 has a first end side connected to the third flow passage 19 and the second flow passage 17 has a second end side open on the outer circumferential surface of the tool body. If there is an opening on the outer circumferential surface of the tool body as described above, a sealing member needs to be provided over the opening portion to prevent the coolant leak. Unfortunately, the configuration including the sealing member as in Japanese Patent No. 6352752 may need a greater number of parts and more manufacturing cost.

In view thereof, it is an object of the present invention to provide a cutting tool that requires the smaller number of parts and can be manufactured at a lower cost.

A cutting tool according to an aspect of the present invention is a cutting tool to be coupled to a machine tool via a holding member, the cutting tool including: a tool body extending along a central axis and rotatable around the central axis; a cutting insert to be mounted on an insert mounting seat of the tool body; and at least one flow passage provided at the inside of the tool body, the at least one flow passage extending from a back end side toward a front end side of the tool body so as to supply a coolant toward at least a part of the inside of the tool body, a back end side of the at least one flow passage being open at a portion sealed by the tool body and the holding member when the holding member is coupled.

According to the above aspect, the back end side of the flow passage for supplying the coolant to the cutting insert is open at a portion sealed by the tool body and the holding member when the holding member is coupled to the tool body. This configuration may prevent the coolant leak without providing a member (for example, a sealing member) to block the opening. A cutting tool may thus be provided that requires the smaller number of parts and can be manufactured at a lower cost.

In the above aspect, the portion sealed by the tool body and the holding member may be a back end surface of a main body of the tool body.

In the above aspect, a back end surface of a main body of the tool body may include a recess recessed toward a front side of the tool body, and an opening on a back end side of the flow passage may be positioned in the recess.

In the above aspect, the at least one flow passage may be provided in a plurality, and each of the plurality of flow passages may extend from a back end side to a front end side of the tool body without crossing one another.

In the above aspect, the at least one flow passage may be provided in a plurality, and at least one of the plurality of flow passages may cross the other flow passages on a way from a back end side to a front end side of the tool body.

In the above aspect, a back end side of the at least one flow passage may be open on an outer circumferential surface of a mounting portion of the tool body.

In the above aspect, the cutting tool may further include a coolant introduction path, the coolant introduction path being provided extending along a central axis of the tool body so as to supply a coolant introduced from a back end side of the tool body to the plurality of flow passages, wherein each of the plurality of flow passages includes a first portion positioned on a front end side thereof and a second portion communicatively connecting between the first portion and the coolant introduction path, the second portion extends in a direction toward an outer circumferential surface of the tool body, and the first portion extends in a direction different from the extension direction of the second portion, and extends in a direction toward a cutting edge of the cutting insert.

The present invention may provide a cutting tool that requires the smaller number of parts and can be manufactured at a lower cost; and

DETAILED DESCRIPTION

Figure 1:
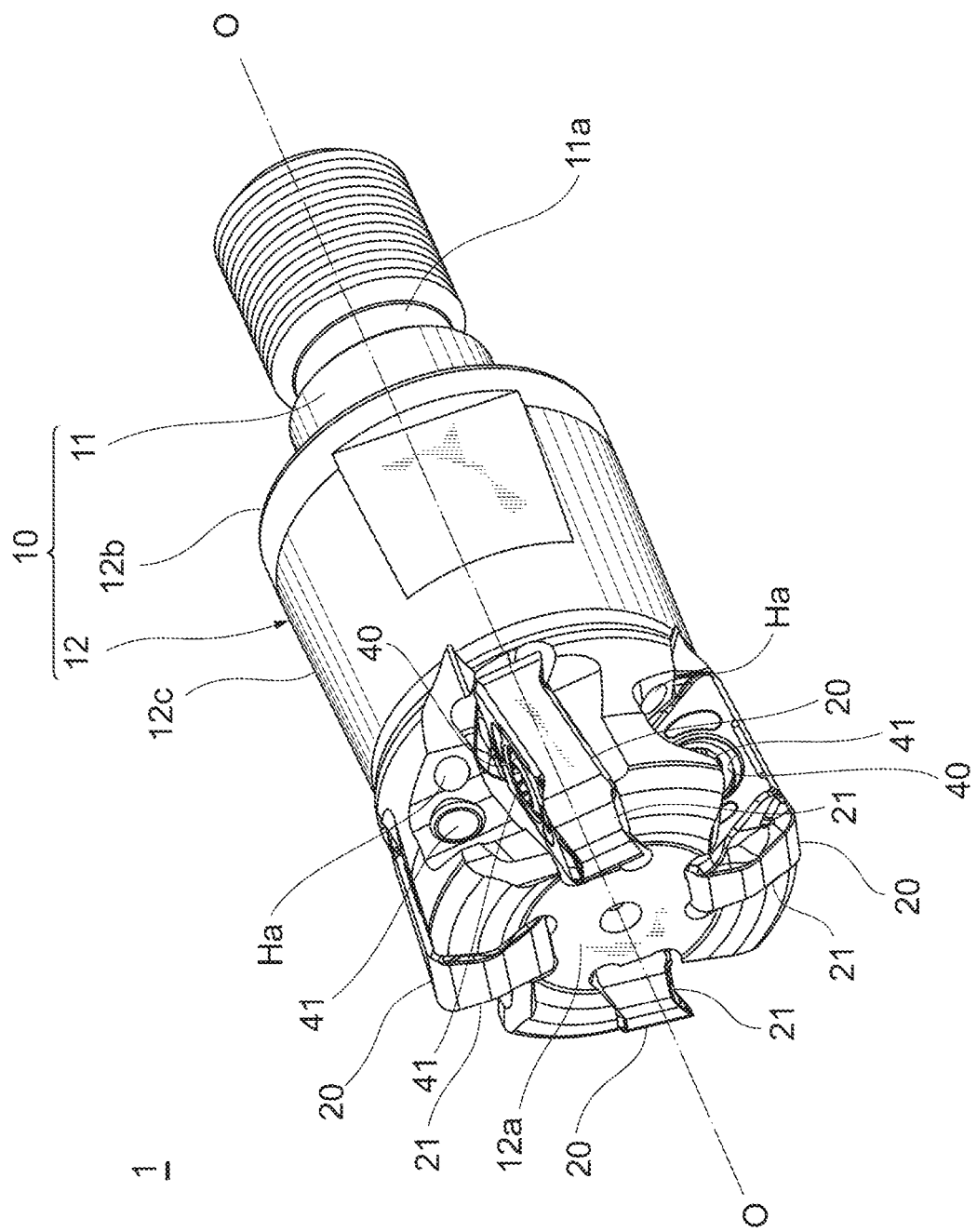
FIG. 1 is a perspective view of a cutting tool according to this embodiment.

With reference to the accompanying drawings, preferred embodiments of the present invention will be described below. The dimension, shape, angle, or the like in the drawings may be different from the actual dimension, shape, angle, or the like. Therefore, the scope of the present invention is not limited to the dimension, shape, angle or the like of each portion represented in these drawings.

Figure 2:
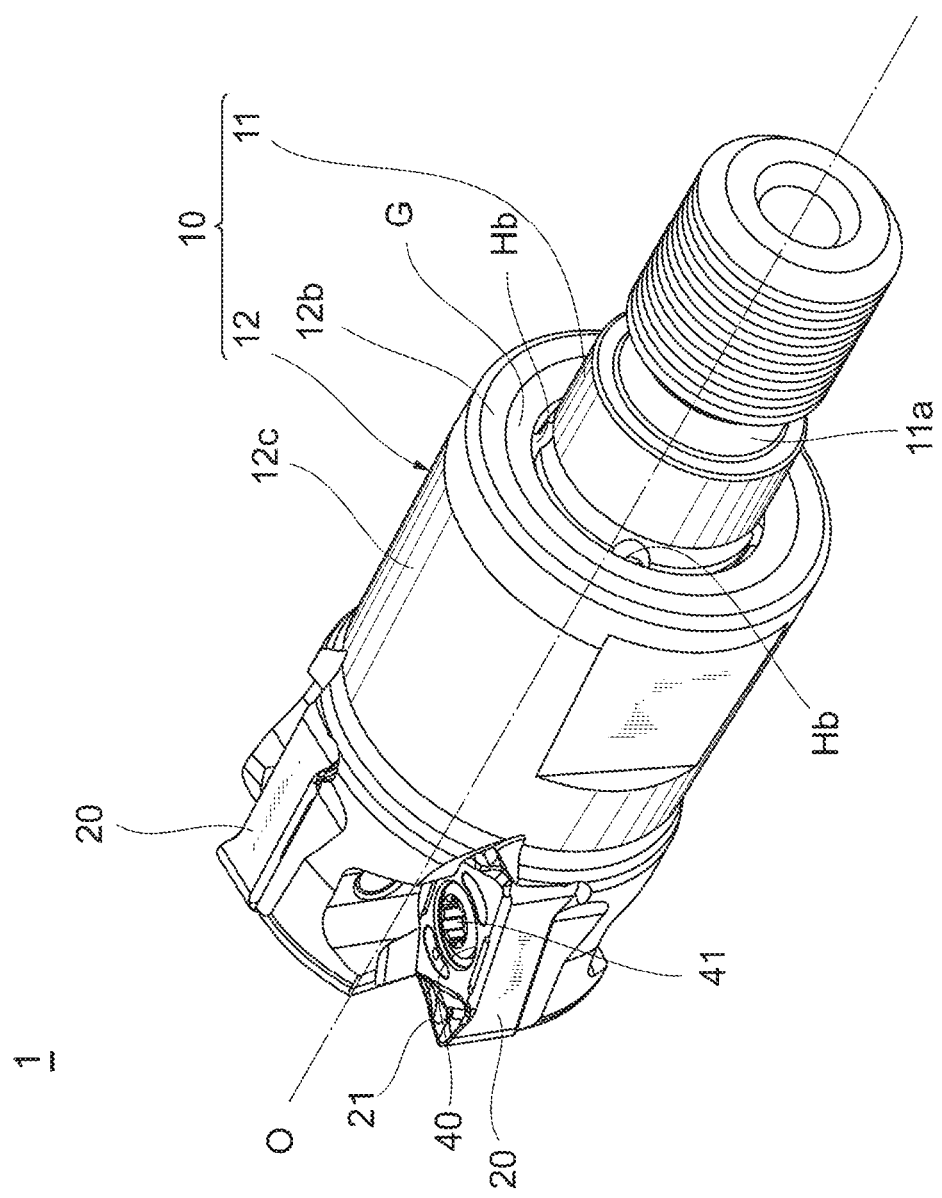
FIG. 2 is a perspective view of the cutting tool shown in FIG. 1 as viewed from a different direction.
Figure 3:
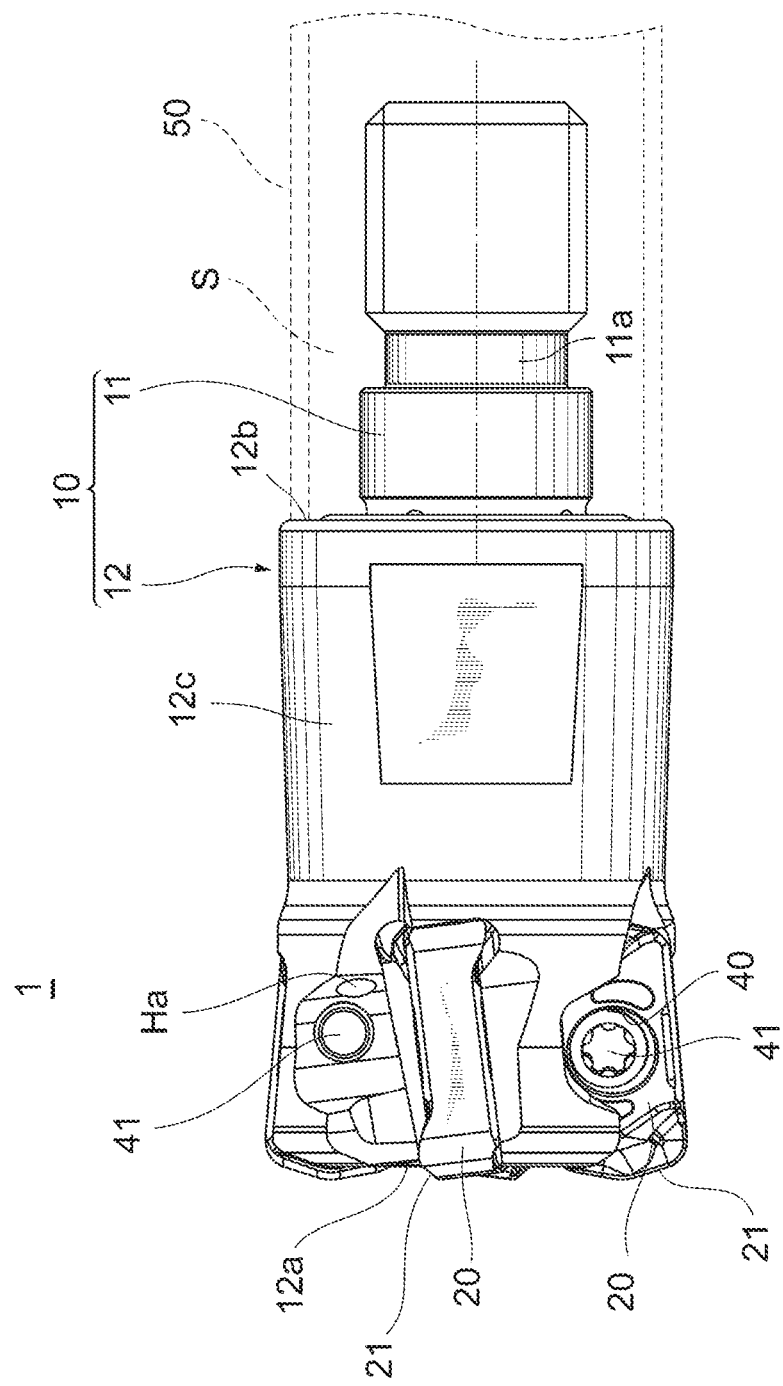
FIG. 3 is a front view of the cutting tool shown in FIG. 1.
Figure 4:
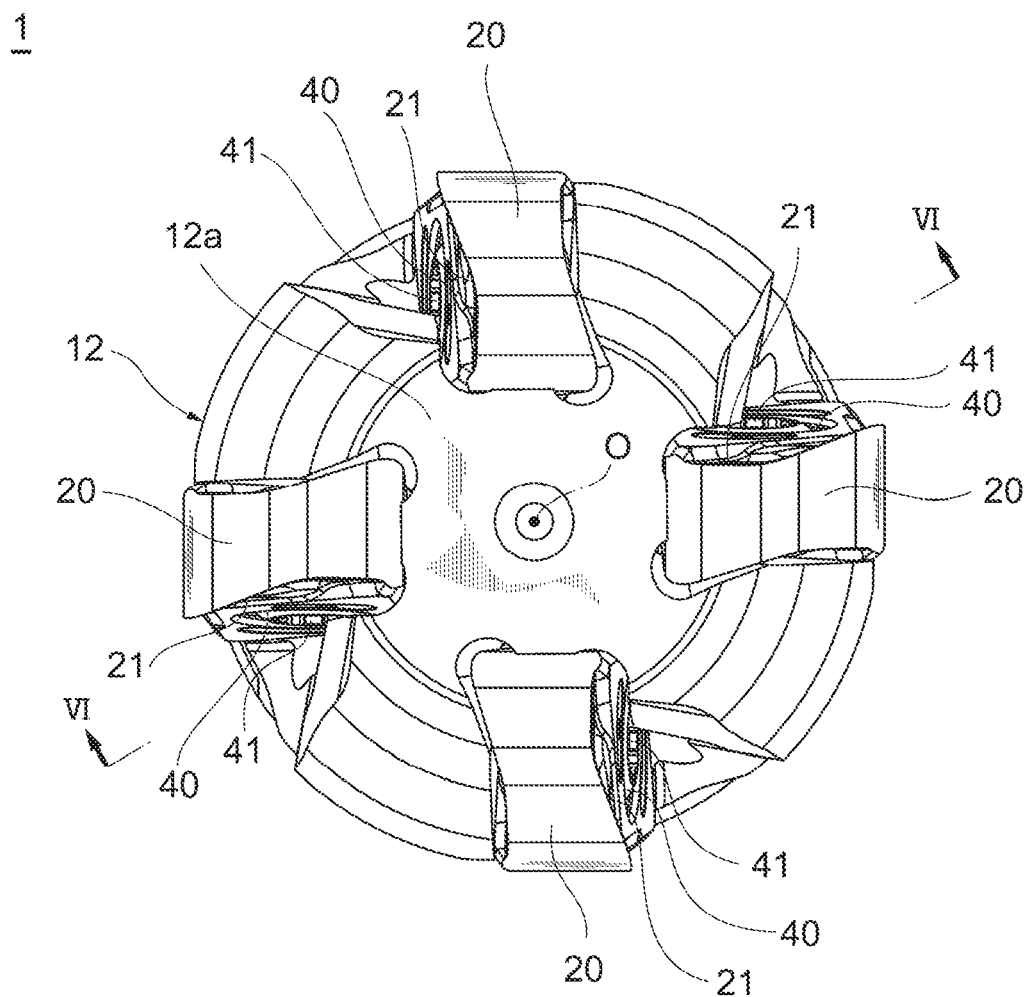
FIG. 4 is a left side view of the cutting tool shown in FIG. 1 as viewed from the front end side.
Figure 5:
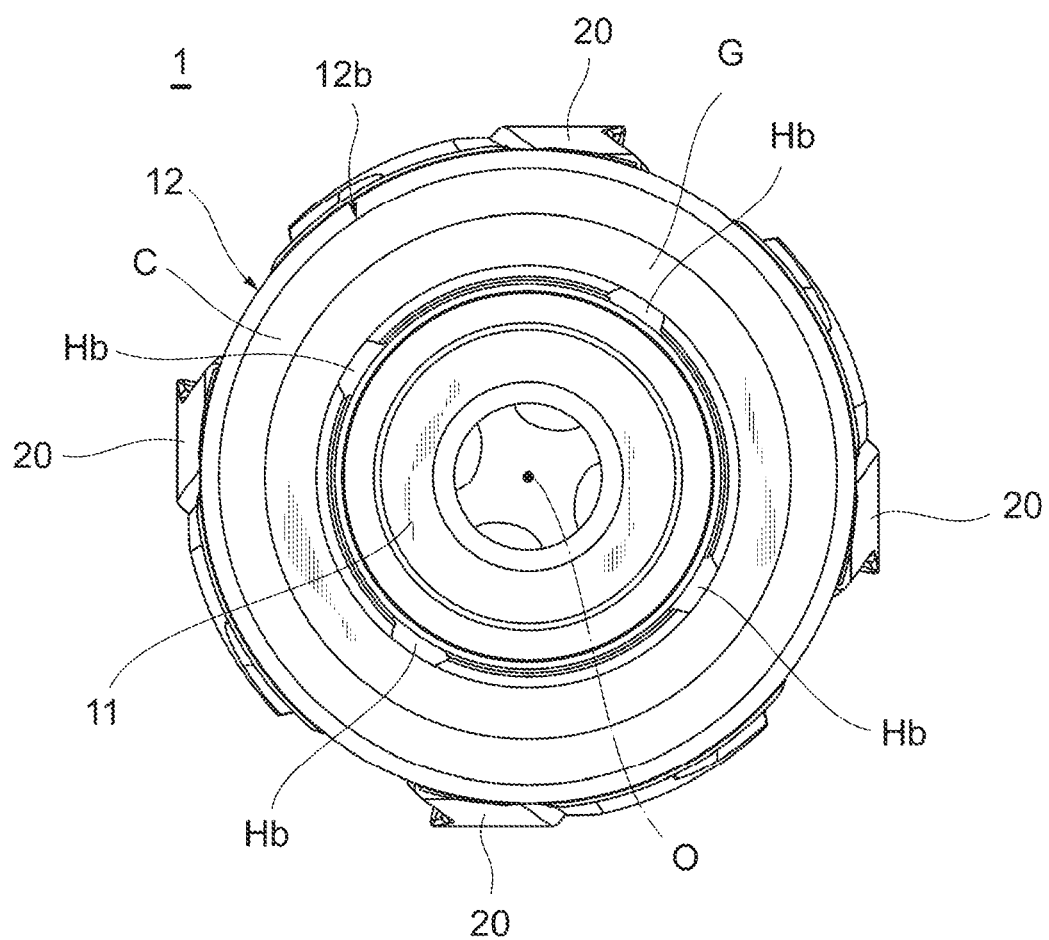
FIG. 5 is a right side view of the cutting tool shown in FIG. 1 as viewed from the back end side.
Figure 6:
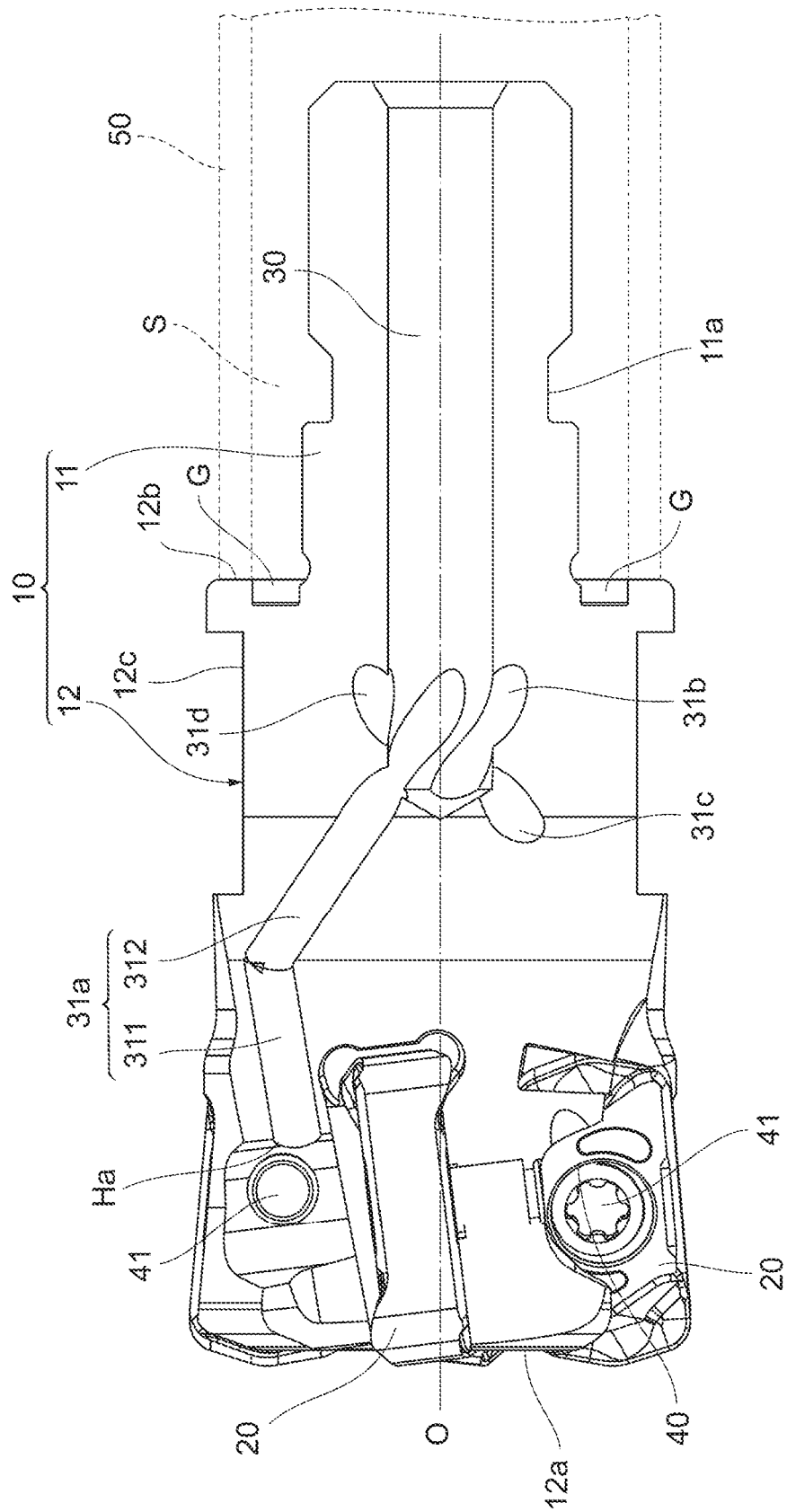
FIG. 6 is a cross-sectional view showing the VI-VI cross-section in FIG. 4.

With reference to FIG. 1 to FIG. 6, a configuration of a cutting tool 1 according to this embodiment will be described below. FIG. 1 is a perspective view of a schematic configuration of the cutting tool 1. FIG. 2 is a perspective view of the cutting tool 1 shown in FIG. 1 as viewed from a different direction. FIG. 3 is a front view of the cutting tool shown in FIG. 1. FIG. 4 is a left side view of the cutting tool shown in FIG. 1 as viewed from the front end side. FIG. 5 is a right side view of the cutting tool shown in FIG. 1 as viewed from the back end side. FIG. 6 is a cross-sectional view showing the VI-VI cross-section in FIG. 4.

The cutting tool 1 includes a tool body 10 rotatable around the central axis O and a plurality of cutting inserts 20. Note that when performing a cutting process using the cutting tool 1 of this embodiment, the cutting tool 1 is coupled to a machine tool via a holding member 50 (see the broken line shown in FIG. 3).

As shown in FIG. 1 to FIG. 3, the tool body 10 has a substantially cylindrical shape extending along the central axis O. The tool body 10 includes a main body 12 and a mounting portion 11 coupled to the back end side (the right side in FIG. 3) of the main body 12. The tool body 10 rotates around the central axis O during the cutting process. In this embodiment, the main body 12 and the mounting portion 11 have a substantially cylindrical shape. Note that FIG. 1 or the like shows the central axis O by a one-dot chain line.

The front end side (the left side in FIG. 3) of the tool body 10 is provided with an insert mounting seat 120 (FIG. 9 and FIG. 10) open on the front end surface and the outer circumferential surface. The insert mounting seat 120 is an area where the cutting insert 20 is to be mounted. The insert mounting seat 120 open on the front end surface and the outer circumferential surface of the tool body 10 allows the cutting insert 20 to be mounted on the insert mounting seat 120 so that a cutting edge 21 of the cutting insert 20 projects beyond the tool body 10 toward the front end side and the outer circumferential side. The portion of the cutting edge 21 projecting beyond the tool body 10 performs the cutting process.

Figure 9:
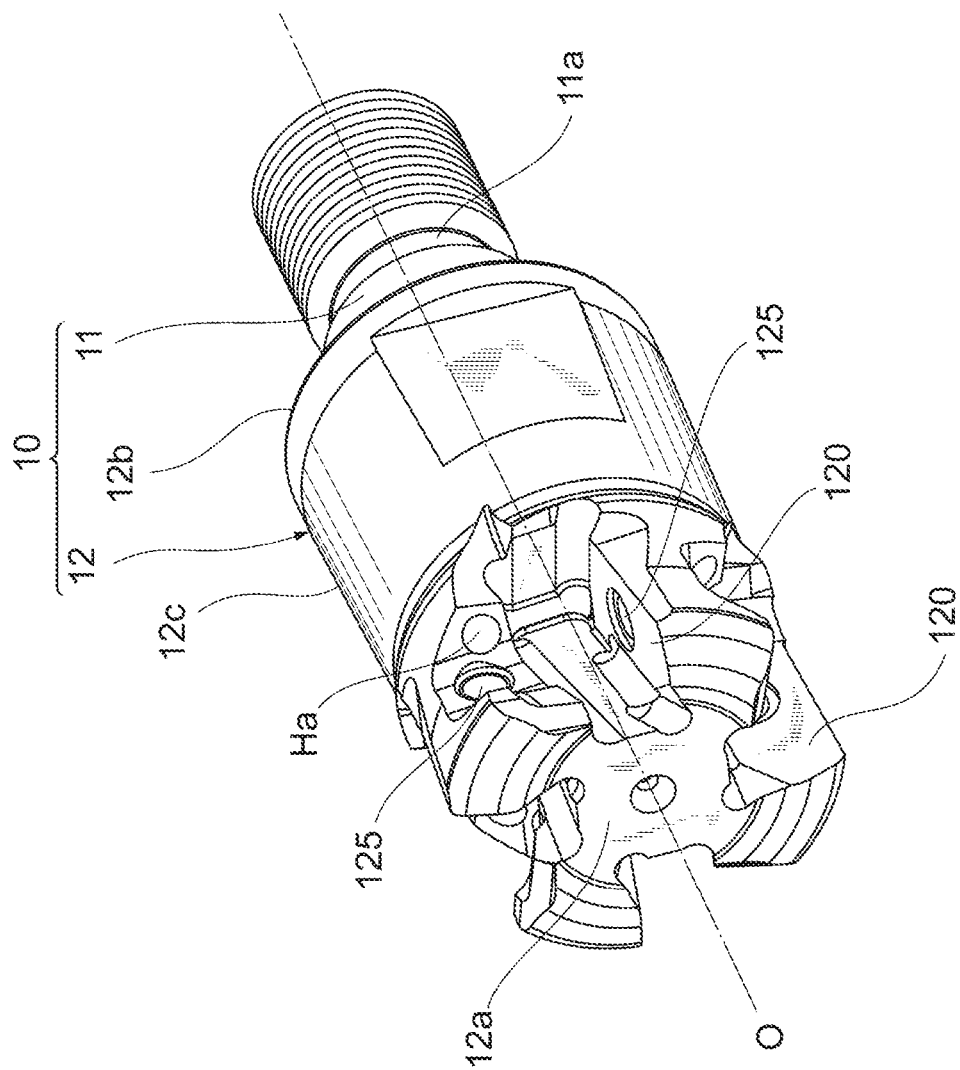
FIG. 9 is a perspective view of a tool body in the cutting tool shown in FIG. 1.
Figure 10:
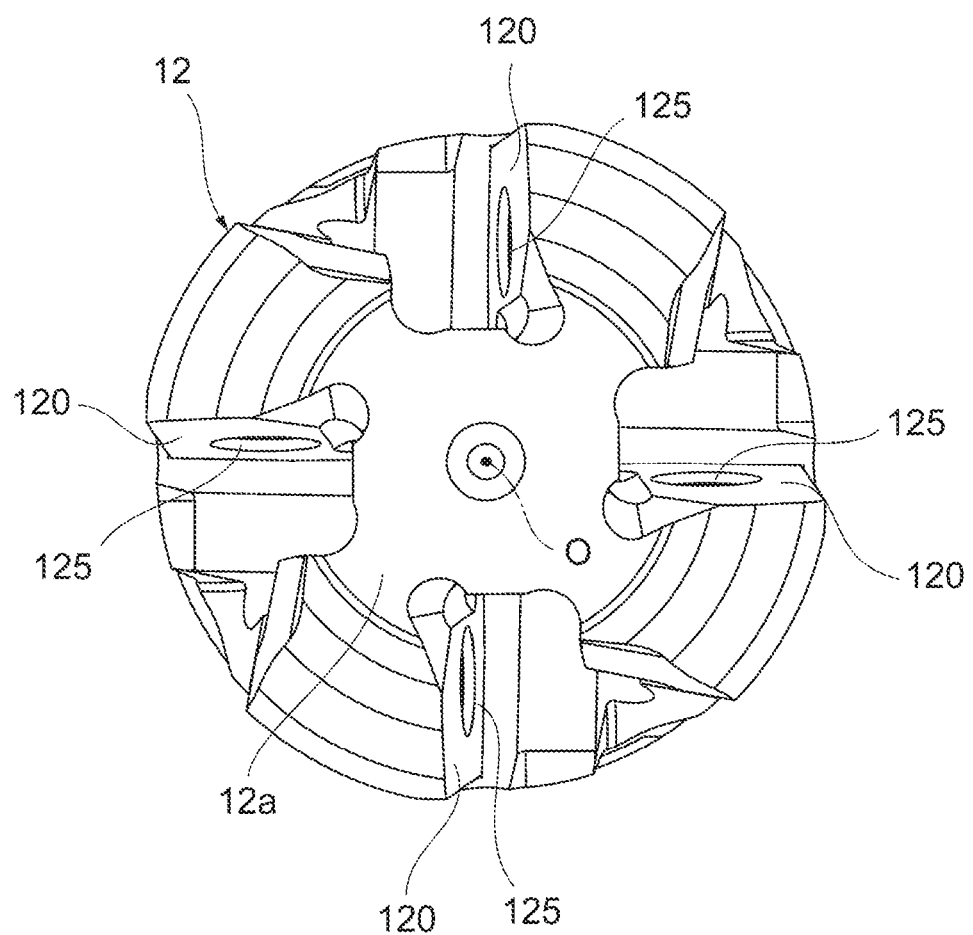
FIG. 10 is a left side view of the tool body in the cutting tool shown in FIG. 1 as viewed from the front end side.

As shown in FIG. 9 and FIG. 10, the cutting tool 1 of this embodiment includes a plurality of insert mounting seats 120. The insert mounting seats 120 are attached with the respective cutting inserts 20. The insert mounting seats 120 may be provided at regular intervals around the central axis O to be rotationally symmetrical when the tool body 10 is viewed from the front end side (FIG. 4 and FIG. 10), although they may be provided at irregular intervals. The shown example shows an embodiment in which four insert mounting seats 120 and four cutting inserts 20 are provided. The number is, however, not limited to the shown example and may be changed as appropriate. In addition, although the substantially square cutting insert 20 is used in the plan view (FIG. 1 or the like), a negative or positive cutting tip of a polygon such as a triangle, hexagon, or others or a round shape or the like may also be applied. In addition, the cutting insert 20 is secured to the insert mounting seat 120 by fastening a screw 41 (FIG. 1 or the like). The screw 41 is insertable into a through-hole 40 (FIG. 1 or the like) formed in the thickness direction of the cutting insert 20 and a hole 125 (see FIG. 9 and FIG. 10) formed on the insert mounting seat 120. Note that the configuration in which the cutting insert 20 is secured to the insert mounting seat 120 is not limited to the above configuration, and any other various configurations may be applied in which the cutting insert 20 may be secured to the insert mounting seat 120.

The back end side (the right side in FIG. 1) of the tool body 10 is provided with the mounting portion 11. The mounting portion 11 is to be attached to the holding member 50 (see FIG. 3) coupled to a machine tool (not shown). The mounting portion 11 has a substantially cylindrical shape extending along the central axis O. In this embodiment, the mounting portion 11 includes a recessed portion 11a of a shape having a diameter reduced radially inwardly from other regions. The mounting portion 11 may include a configuration in which, for example, the mounting portion 11 includes a male screw portion (not shown) on its outer circumferential surface and the male screw portion is screwed together with a female screw portion (not shown) of the holding member 50. The mounting portion 11 is, however, not limited to this example, and the mounting portion 11 may have various aspects as appropriate in which the mounting portion 11 has a function couplable to the holding member 50 (see FIG. 3).

Note that the holding member 50 may be, for example, a shank that may be rotated around the central axis O and include a female screw portion that may be screwed into the mounting portion 11. The female screw portion formed on the shank may be screwed together with the male screw portion (not shown) formed on the outer circumferential surface of the mounting portion 11 to be coupled to the rear side of the tool body 10. The holding member 50 may be configured as a shank as described above. The holding member 50 may also be an arbor configured to be secured to the main axis of a machine tool (not shown) and rotate around the rotating shaft. Alternatively, the holding member 50 may have a configuration that includes the shank and arbor. The holding member 50 is not limited to a mechanism that includes the shank or arbor or the like, and any other various configurations may be applied to the holding member 50 that may work with being coupled to the tool body 10.

The tool body 10 includes therein a coolant introduction hole 30 for introducing a coolant. The coolant introduction hole 30 extends substantially linearly from the back end side of the tool body 10 to the substantially center portion of the tool body 10 along the central axis O of the tool body 10. A coolant is introduced from the back end side of the coolant introduction hole 30 (the holding member 50 side coupled to the tool body 10). The coolant then flows toward the front end side. The front end side of the coolant introduction hole 30 is provided with flow passages 31a, 31b, 31c, and 31d. Here, the flow passages 31a, 31b, 31c, and 31d are communicatively connected to the inside of the coolant introduction hole 30.

The flow passages 31a, 31b, 31c, and 31d extend from the back end side toward the front end side of the tool body 10. The flow passages 31a, 31b, 31c, and 31d are in communication with the coolant introduction hole 30. The flow passages 31a, 31b, 31c, and 31d function as portions through which the coolant flows during use of the cutting tool 1. The flow passages 31a, 31b, 31c, and 31d include a front end side open on the front end side of the tool body 10 and a back end side open on the back end side of the tool body 10. In more detail, the flow passages 31a, 31b, 31c, and 31d have a front end side open in an area where the cutting insert 20 is mounted (in other words, a position that allows the coolant to be injected to the cutting insert 20 mounted on the insert mounting seat 120)(the openings Ha shown in FIG. 1 or the like). The flow passages 31a, 31b, 31c, and 31d also have a back end side open on the back end surface 12b of the main body 12 of the tool body 10 (the openings Hb shown in FIG. 5 or the like). A coolant introduced via the coolant introduction hole 30 flows toward the front end side of the tool body 10 via the flow passages 31a, 31b, 31c, and 31d that are in internal communication with the coolant introduction hole 30. The coolant is then injected from the openings Ha of the flow passages 31a, 31b, 31c, and 31d.

The openings Hb on the back ends of the flow passages 31a, 31b, 31c, and 31d are open on the back end side of the main body 12 of the tool body 10. In more detail, the back end sides of the flow passages 31a, 31b, 31c, and 31d (the right end sides of the flow passages 31a, 31b, 31c, and 31d in the front view (FIG. 3) of the tool body 10) are open at a portion sealed by the tool body 10 and the holding member 50 when the holding member 50 is coupled to the tool body 10. In other words, the back end sides of the tool body 10 of the flow passages 31a, 31b, 31c, and 31d are not open at a portion (for example, the outer circumferential surface 12c of the main body 12 of the tool body 10 or the like) not sealed by the tool body 10 and the holding member 50. If, for example, the openings on the back end sides of the flow passages 31a, 31b, 31c, and 31d are open on the outer circumferential surface 12c of the main body 12, a sealing member needs to be provided to block the openings on the outer circumferential surface 12c to prevent the coolant leak. In this embodiment, the openings Hb on the back end sides of the flow passages 31a, 31b, 31c, and 31d are positioned in a portion sealed by the holding member 50, thus allowing prevention of the coolant leak without providing a sealing member to prevent the coolant leak. A cutting tool may thus be provided that requires the smaller number of parts and can be manufactured at a lower cost.

Note that the portion sealed by the tool body 10 and the holding member 50 is not limited to the aspect shown. For example, the portion sealed includes an aspect in which the tool body 10 and the holding member 50 are contacted to completely block the openings Hb (i.e., the openings Hb are positioned on a contact surface (sealing surface) in which the tool body 10 and the holding member 50 are contacted). The portion sealed also include an aspect in which the openings Hb themselves are not blocked by the holding member 50, but the openings Hbs are positioned in the space S (FIG. 3 or the like) enclosed by the tool body 10 and the holding member 50. Further, the portion sealed by the tool body 10 and the holding member 50 includes an aspect in which the tool body 10 and the holding member 50 are contacted to block a portion of the openings Hb, and the remaining openings Hb are positioned in the space S (FIG. 3 or the like) enclosed by the tool body 10 and the holding member 50. When the openings Hb are positioned, for example, on the back end surface 12b, the openings Hb may only be positioned radially inwardly from the contact surface C in which the tool body 10 and the holding member 50 are contacted, when the tool body 10 is viewed from the back end side (FIG. 5).

The back end surface 12b described above includes a groove G exhibiting a shape recessed toward the front side (the left side in FIG. 3) of the tool body 10. The groove G is substantially annularly formed along a radially inward part of the substantially annular contact surface C (FIG. 5) in which the tool body 10 and the holding member 50 are contacted. The groove G exhibits a substantially rectangular shape in a longitudinal section view of the tool body 10 (FIG. 6). In this embodiment, it is preferable that at least a portion of the openings Hb on the back end sides of the flow passages 31a, 31b, 31c, and 31d is positioned in an area (recess) in the back end surface 12b that is recessed toward the front side of the tool body 10. Note that in this embodiment, the area (recess) in the back end surface 12b that is recessed toward the front side of the tool body 10 includes the groove G.

Although FIG. 5 or the like shows an example where the openings Hb are positioned on the back end surface 12b of the main body 12 of the tool body 10, the openings Hb are not limited to this example. For example, the openings Hb may be positioned on the outer circumferential surface of the mounting portion 11 of the tool body 10. In other words, the openings Hb in this embodiment may be provided at any position of the tool body 10 that is positioned in a portion sealed by the holding member 50 when the holding member 50 is coupled to the tool body 10.

Figure 7:
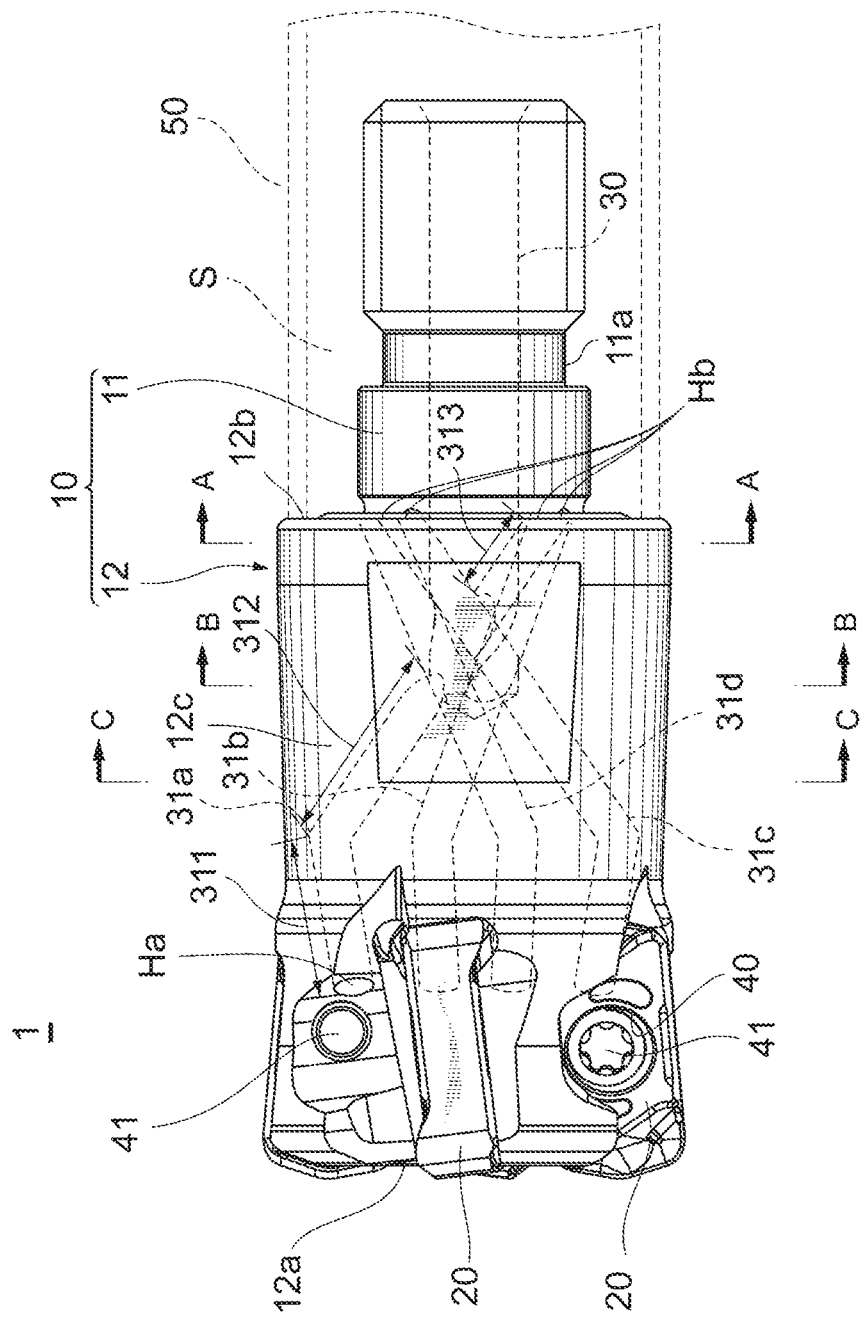
FIG. 7 is a transparent view of the cutting tool shown in FIG. 1 showing a flow passage.
Figure 8A:
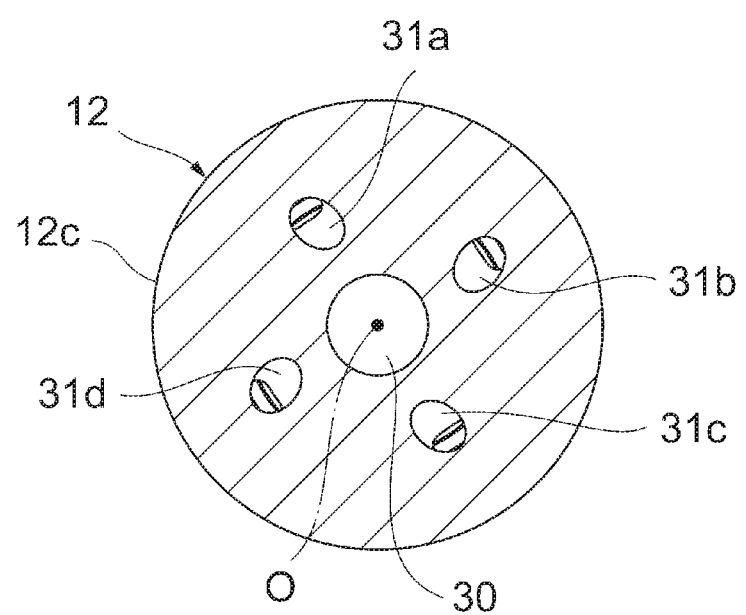
FIG. 8A is a cross-sectional view showing the A-A cross-section in FIG. 7.
Figure 8B:
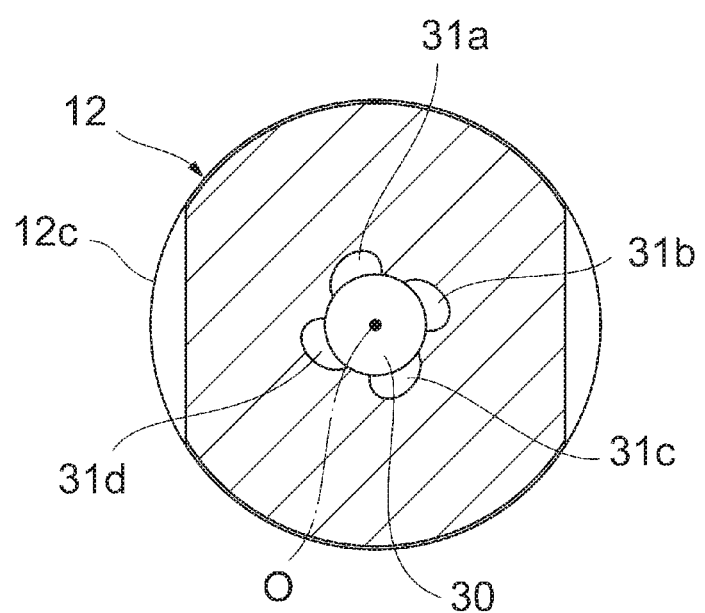
FIG. 8B is a cross-sectional view showing the B-B cross-section in FIG. 7.
Figure 8C:
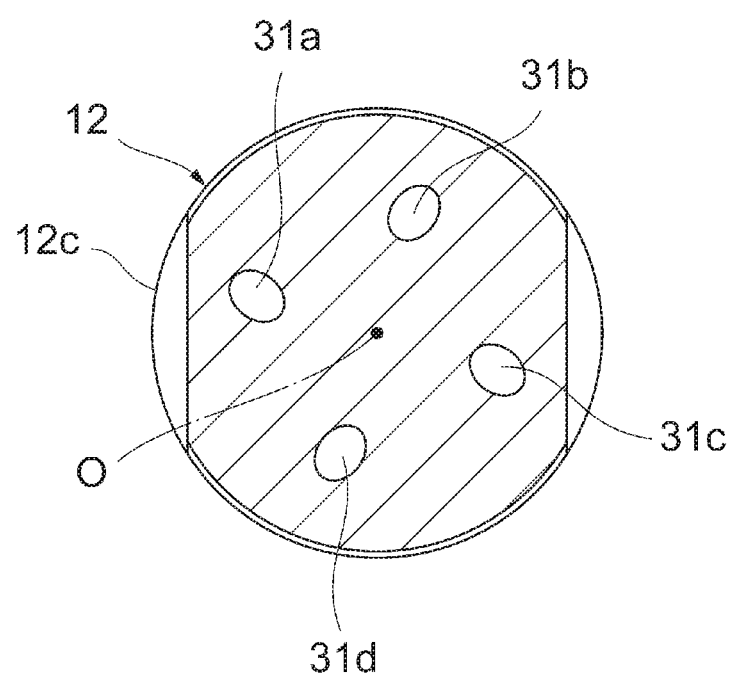
FIG. 8C is a cross-sectional view showing the C-C cross-section in FIG. 7.

The configurations of the flow passages 31a, 31b, 31c, and 31d will be further described. FIG. 7 is a transparent view of the cutting tool shown in FIG. 1 showing a flow passage. FIG. 8A is a cross-sectional view showing the A-A cross-section in FIG. 7. FIG. 8B is a cross-sectional view showing the B-B cross-section in FIG. 7. FIG. 8C is a cross-sectional view showing the C-C cross-section in FIG. 7.

Each of the flow passages 31a, 31b, 31c, and 31d extends from the front end side to the back end side of the tool body 10 without crossing each other. In other words, each of any flow passage of the flow passages 31a, 31b, 31c, and 31d extends from the front end side to the back end side of the tool body 10 without meeting each other. In more detail, as shown in FIGS. 8A to 8C (the A-A cross-section, B-B cross-section, and C-C cross-section of the tool body 10) when viewed in a cross section perpendicular to the direction along the central axis O of the tool body 10, each of the flow passages 31a, 31b, 31c, and 31d does not meet any other flow passages (each of the flow passages 31a, 31b, 31c, and 31d does not cross each other). If each flow passage met, a coolant flowing in one flow passage in its longitudinal direction (the extension direction of the flow passage) might be affected by a flow of a coolant flowing from the other flow passages toward the meeting portion (a meeting portion in which each flow passage meets) and lose the flow velocity of the coolant. In this embodiment, the flow passages 31a, 31b, 31c, and 31d do not cross each other, and so a coolant flowing in each of the flow passages 31a, 31b, 31c, and 31d is not affected by a flow of a coolant flowing in from the other flow passages. A coolant flowing inside the flow passages 31a, 31b, 31c, and 31d may thus be flown well in the direction from the back end side to the front end side of the tool body 10.

Note that each of the cross sections of the flow passages 31a, 31b, 31c, and 31d that are perpendicular to the coolant flow direction has a circular shape. However, the flow passages 31a, 31b, 31c, and 31d in this embodiment may take any shape, size, or the like that may allow good flow of the coolant therein.

Note that at least one flow passage of the flow passages 31a, 31b, 31c, and 31d may cross the other flow passages on the way from the back end side toward the front end side of the tool body 10. For example, one flow passage 31a may cross at least one flow passage of the other flow passages 31b, 31c, and 31d, or each of two or more flow passages may cross the other flow passages, or all flow passages may cross each other. Without being limited to these examples, any other various aspects may be applied in which each flow passage crosses. Note that although the openings Hb on the back end side of the flow passages 31a, 31b, 31c, and 31d may be disposed at any position of the tool body 10 that is in a portion sealed by the holding member 50 as described above, the openings Hb may be configured to be positioned, for example, on the outer circumferential surface of the mounting portion 11, if at least one flow passage of the flow passages 31a, 31 b, 31c, and 31d crosses the other flow passages.

As shown in FIG. 7, the flow passages 31a, 31b, 31c, and 31d include the following portions: a portion (hereinafter referred to a flow passage front end portion (first portion)) extending to the openings Ha open on the front end side of the flow passages; a portion (hereinafter referred to a flow passage back end portion) extending from the openings Hb open on the back end side of the flow passages to a position in communication with the coolant introduction hole 30; and a portion (hereinafter referred to a flow passage intermediate portion (second portion)) connecting between the back end portion of the flow passage front end portion and the coolant introduction hole 30. Although the flow passage front end portion, the flow passage intermediate portion, and the flow passage back end portion extend linearly in this embodiment, the flow passage front end portion, the flow passage intermediate portion, and the flow passage back end portion may take any shape that may allow good flow of the coolant. In FIG. 7, the flow passage back end portion of the flow passage 31a is shown by the reference numeral 313, the flow passage intermediate portion of the flow passage 31a is shown by the reference numeral 312, and the flow passage front end portion of the flow passage 31a is shown by the reference numeral 311. The configuration of the flow passage 31a will be described below, and the description of the other flow passages 31b, 31c, and 31d are omitted here.

In the flow passage back end portion 313 of the flow passage 31a, the opening Hb positioned on its back end side is blocked by the holding member 50. Therefore, in substance, the flow passage back end portion 313 does not function as a flow passage, and the flow passage intermediate portion 312 and the flow passage front end portion 311 of the flow passage 31a function as the flow passage.

The flow passage intermediate portion 312 (the second portion) extends in a direction that gradually approaches the outer circumferential surface of the tool body 10 as approaching the front end side of the tool body 10. Here, the flow passage front end portion 311 (the first portion) is communicatively connected to the front end side of the flow passage intermediate portion 312. The flow passage front end portion 311 extends in a direction different from the extension direction of the flow passage intermediate portion 312. The flow passage front end portion 311 extends in a direction toward the cutting edge 21 of the cutting insert 20. In so doing, in order to inject the coolant toward around the cutting edge 21 from the opening Ha open on the front end side of the flow passage front end portion 311, it is preferable to set the extension direction of the flow passage front end portion 311 such that the cutting edge 21 is positioned on the extension of the extension direction of the flow passage front end portion 311.

In addition, the extension direction length of the flow passage front end portion 311 is preferably set as follows. Specifically, it is preferable to set the extension direction length of the flow passage front end portion 311 to be one-third or more of the extension direction length of the entire flow passage 31a (the flow passage front end portion 311, the flow passage intermediate portion 312, and the flow passage back end portion 313). Alternatively, it is preferable to set the extension direction length of the flow passage front end portion 311 to be longer than the extension direction length of the flow passage intermediate portion 312. The above setting of the extension direction length of the flow passage front end portion 311 may provide a sufficient entrance region for stable injection in the extension direction of the passage end portion 311. The entrance region is provided after the coolant flowing in the extension direction of the flow passage intermediate portion 312 (the direction toward the outer circumferential surface of the tool body 10) flows into the flow passage front end portion 311 in a different direction and before the coolant is injected from the opening Ha. This allows more stable injection of the coolant in a direction toward the cutting edge 21 of the cutting insert 20 from the opening Ha of the flow passage front end portion 311. This may improve the cooling performance of the cutting edge 21. Note that although the configuration of the flow passage front end portion 311 of the flow passage 31a or the like is described above, the other flow passages 31b, 31c, and 31d may have the same configuration as the flow passage 31a. This may improve the cooling performance of the cutting edge 21 of each cutting insert 20 by the coolant injected from the opening Ha.

In addition, the inner diameter of the flow passage front end portion 311 may be smaller than the inner diameter of the flow passage intermediate portion 312. The inner diameter of the flow passage front end portion 311 that is smaller than the inner diameter of the flow passage intermediate portion 312 may increase the pressure applied on the coolant flowing in the flow passage front end portion 311. This may increase the force of the coolant injected from the opening Ha.

Note that the flow passages 31a, 31 b, 31c, and 31d described above may be formed by, for example, a boring process using a drill or the like. For example, the flow passage 31a may be formed by boring from the back end surface 12b of the main body 12 of the tool body 10 toward the front end surface. With the above boring process, the openings Hb open on the back end side of the flow passages 31a, 31b, 31c, and 31d may be positioned on the back end surface 12b. Also with the above boring process, the linear flow passages 31a, 31b, 31c, and 31d may be easily formed.

The embodiments described above are for ease of understanding of the present invention, and should not be construed as limiting the present invention. The flowchart and sequence described in the embodiments, each element and its arrangement, material, condition, shape, size, or the like included by the embodiments are not limited to those illustrated and may be changed as appropriate. In addition, the configurations shown in different embodiments may be partially replaced or combined.

What is claimed is:

1. A cutting tool to be coupled to a machine tool via a holding member, the cutting tool comprising:

a tool body extending along a central axis and rotatable around the central axis, the tool body comprising a main body and a mounting portion extending from a back end side of the main body, wherein the mounting portion fits inside the holding member and couples to the holding member;

a cutting insert to be mounted on an insert mounting seat of the tool body; and at least one flow passage provided at an inside of the tool body, the at least one flow passage extending from a back end side of the mounting portion toward a front end side of the tool body so as to supply a coolant toward at least a part of the inside of the tool body, a back end side of the at least one flow passage being open at a portion sealed by the mounting portion and the holding member when the holding member is coupled to the mounting portion, the portion being an outer circumferential surface of the mounting portion of the tool body, wherein a back end surface of the main body of the tool body includes a recess recessed toward a front side of the tool body, the recess having a substantially annular shape and disposed radially inward of a substantially annular contact surface where the tool body contacts the holding member, and an opening on a back end side of the at least one flow passage is positioned in the recess.

2. The cutting tool according to claim 1, wherein the portion sealed by the tool body and the holding member is a back end surface of a main body of the tool body.

3. The cutting tool according to claim 2, wherein the at least one flow passage comprises a plurality of flow passages, and each of the plurality of flow passages extends from a back end side to a front end side of the tool body without crossing one another.

4. The cutting tool according to claim 2, further comprising:

a coolant introduction path, the coolant introduction path being provided extending along a central axis of the tool body so as to supply a coolant introduced from a back end side of the tool body to the at least one flow passage, wherein the at least one flow passage comprises a plurality of flow passages, and each of the plurality of flow passages includes a first portion extending linearly and positioned on a front end side thereof and a second portion extending linearly and communicatively connecting between the first portion and the coolant introduction path, the second portion is inclined with respect to the central axis of the tool body, and extends in a direction toward an outer circumferential surface of the tool body and approaches the front end side of the tool body, and the first portion extends in a direction different from the extension direction of the second portion, and extends in a direction toward a cutting edge of the cutting insert.

5. The cutting tool according to claim 1, wherein the at least one flow passage comprises a plurality of flow passages, and each of the plurality of flow passages extends from a back end side to a front end side of the tool body without crossing one another.

6. The cutting tool according to claim 1, further comprising:

a coolant introduction path, the coolant introduction path being provided extending along a central axis of the tool body so as to supply a coolant introduced from a back end side of the tool body to the at least one flow passage, wherein the at least one flow passage comprises a plurality of flow passages, and each of the plurality of flow passages includes a first portion extending linearly and positioned on a front end side thereof and a second portion extending linearly and communicatively connecting between the first portion and the coolant introduction path, the second portion is inclined with respect to the central axis of the tool body, and extends in a direction toward an outer circumferential surface of the tool body and approaches the front end side of the tool body, and the first portion extends in a direction different from the extension direction of the second portion, and extends in a direction toward a cutting edge of the cutting insert.

* * * * *